United States Patent [19]

Braat

[11] Patent Number: 4,499,574
[45] Date of Patent: Feb. 12, 1985

[54] RECORD CARRIER WITH AN OPTICALLY READABLE INFORMATION STRUCTURE

[75] Inventor: Josephus J. M. Braat, Eindhoven, Netherlands

[73] Assignee: U.S. Philips Corporation, New York, N.Y.

[21] Appl. No.: 46,419

[22] Filed: Jun. 7, 1979

[30] Foreign Application Priority Data

Mar. 27, 1979 [NL] Netherlands .......................... 7902363

[51] Int. Cl.³ .......................... G11B 5/82; G11B 7/06
[52] U.S. Cl. .................................... 369/275; 369/109; 369/111; 369/284; 369/51
[58] Field of Search ................................ 358/127, 128; 179/100.1 G, 100.3 V, 100.4 C; 360/78, 133, 135; 274/41 R, 41.6 R, 41.6 S, 42 R; 35/127, 128; 369/109, 51, 111, 275, 284

[56] References Cited

U.S. PATENT DOCUMENTS 3,931,457  1/1976  Mes ................................... 358/128.5
4,118,734  10/1978 Bouwhuis et al. .......... 179/100.1 G
4,125,859  11/1978 Oshida et al. ................. 179/100.1 G
4,157,460  6/1979  Bottali et al. ................. 179/100.4 C
4,157,568  6/1979  Ohki et al. ............... 179/100.3 V X

OTHER PUBLICATIONS

Applied Optics; Velzel, vol. 17, No. 13, 1 Jul. 1978, pp. 2029–2036, copy provided by applicant.

Primary Examiner—Aristotelis M. Psitos
Attorney, Agent, or Firm—Robert T. Mayer; Algy Tamoshunas

[57] ABSTRACT

A record carrier is described having an optically readable information structure comprising trackwise arranged information areas which, in the track direction, alternate with intermediate areas, the information being contained in at least the local length of the information areas, of which information structure the average length of the information areas varies. It is demonstrated that by adapting the track period to the average length of the information areas in the tracks, the crosstalk between the tracks may be reduced without essentially reducing the information density.

5 Claims, 8 Drawing Figures

RECORD CARRIER WITH AN OPTICALLY READABLE INFORMATION STRUCTURE

The invention relates to a record carrier with an optically readable information structure comprising trackwise arranged information areas which, in the track direction, alternate with intermediate areas, the information being contained in at least the local lengths of the information areas, of which information structure the average length of the information areas varies.

Average length is to be understood to mean the average of the local length of the information areas over a distance which is several orders greater than the information areas.

Such a record carrier is known, inter alia from: "Philips Technisch Tijdschrift"33, No. 7, pages 185–179. The round disc-shaped record carrier described therein is employed as a storage medium for a colour television program, the luminance information of the television picture being contained in the spatial frequency of the information areas, while the chrominance and sound information is contained in the variation of the lengths ("duty-cycle") of the information areas. The information areas consist of pits pressed into the carrier surface. The dimensions of these pits are very small. For a record carrier in which a thirty-minute television programme is stored in an annular area with an inner radius of 5 cm and an outer radius of 15 cm, the article states that the average length of the information areas in the track direction is of the order of 1 $\mu$m, the constant width of said areas is of the order of 0.8 $\mu$m, and the constant period of the track structure, transverse to the track direction, is approximately 2 $\mu$m.

During reading the information structure is illuminated with a read beam, for example a laser beam, which by means of an objective system is focussed on the information structure to a read spot whose "diameter" is of the order of magnitude of the information areas. Arranged in the path of the read beam, which has been modulated by the information structure, is a radiation sensitive detector, whose output signal varies depending on the portion of the information structure being read instantaneously.

The objective system which is used has a numerical aperture (N.A.) of, for example 0.4. The "diameter" of the read spot is substantially equal to the theoretical minimum of a lens having this numerical aperture. The aberrations of the selected objective system are negligibly small, so that the intensity distribution in the read spot and the dimensions of this spot are no longer dictated by the laws of geometrical optics, but solely by diffraction at the aperture of the objective system. If a gas laser, for example a He-Ne laser, is employed as radiation source, the intensity distribution over the entrance pupil of the objective system varies in a radial direction. In combination with the diffraction effects at the lens aperture this results in an intensity distribution over the read spot whose half-value diameter of the intensity (=the "diameter" of the intensity) is for example 0.9 $\mu$m at a wave length of for example 0.633 $\mu$m. This means that when the tracking is correct, the greater part of the read radiation is incident on the track to be read, but nevertheless a part of the read radiation is incident on the adjacent tracks and is modulated by the information areas of these tracks. After modulation, a certain part of the radiation which is incident on the adjacent tracks enters the objective system and ultimately reaches the detector. This means that there is always some cross-talk between the tracks, even in the case of a satisfactory tracking.

This cross-talk could be minimized by substantially increasing the uniform distance between the tracks. However, this would result in a substantial reduction of the information density on, and thus the playing time of, the record carrier. However, there is a growing trend to increase the playing time of optical record carriers. The optically readable video discs made presently, for example have a uniform track period, in the radial direction, of approximately 1.67 $\mu$m instead of the 2 $\mu$m mentioned in the cited article. When reading this record carrier the cross-talk may exceed the permissible level.

The Applicant has developed a theory and has made calculations, which have been corroborated by experiments, from which it is evident that and to what extent the cross-talk between the tracks is dependent on the average frequency of the information areas in the tracks. On the basis of this it is now possible to propose a record carrier which in comparison with record carriers known to date exhibits a reduced cross-talk, while the information density remains sufficiently large.

The record carrier in accordance with the invention is characterized in that the distance between the tracks is determined by the average length of the information areas in these tracks, so that a greater average length corresponds to a greater track distance.

The concept of the record carrier in accordance with the invention is based on the recognition that, for a specific track distance, at frequencies of the information areas, in the track direction, up to approximately half the cut-off frequency of the optical read system the cross-talk has the desired level. Between tracks in which the frequency of the information areas is higher than approximately half the cut-off frequency the cross-talk exceeds the desired level. These tracks should then be disposed slightly further apart, so that the information density of these tracks is slightly reduced. However, between tracks in which the frequency of the information areas is lower than approximately half the cut-off frequency, the cross-talk is smaller than the required level. These tracks may then be slightly closer to each other, so that the information density of these tracks is slightly greater.

The present invention can be used not only in a record carrier with prerecorded information, but may also be used in a record carrier in which the user can write information. Such a record carrier is characterized in that the information comprises address information which is contained in track sectors in the form of optically readable areas. The parts of the tracks between the sectors are provided with a material which is inscribable with optical radiation and the distance between the tracks is determined by the average length of the areas in the track sectors.

A preferred embodiment of a record carrier having essentially concentric tracks, a constant amount of information being stored in each track, is further characterized in that the distance between the inner tracks is greater than the distance between the outer tracks.

Such a record carrier may be a disc on which a television program is stored, one television picture being contained in each track turn, and also a record carrier on which information can be written by the user.

The expression "essentially concentric" with reference to the tracks is to be understood to mean that these tracks may either be interconnected and together constitute a spiral track, or be real concentric closed tracks.

The invention is now described in more detail with reference to the drawing, wherein.

Figure 3:
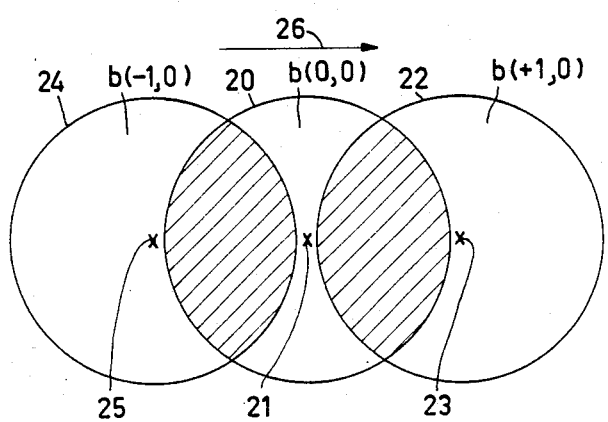
Figure 4:
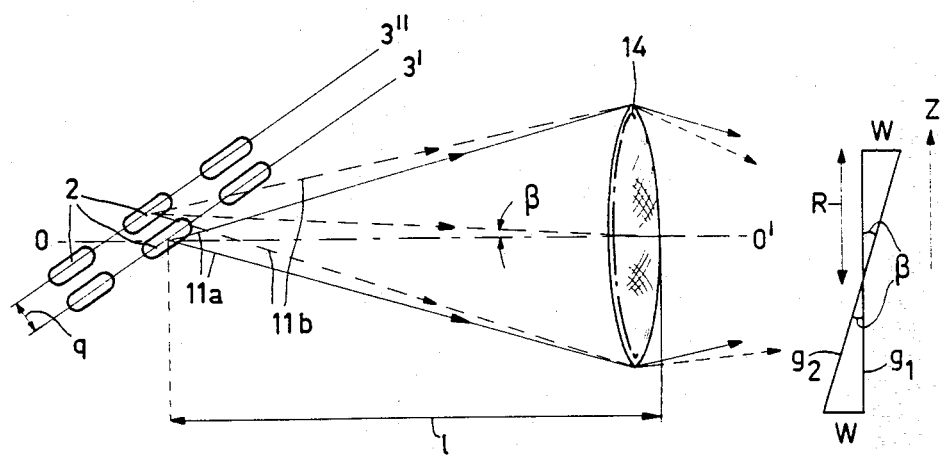
Figure 5:
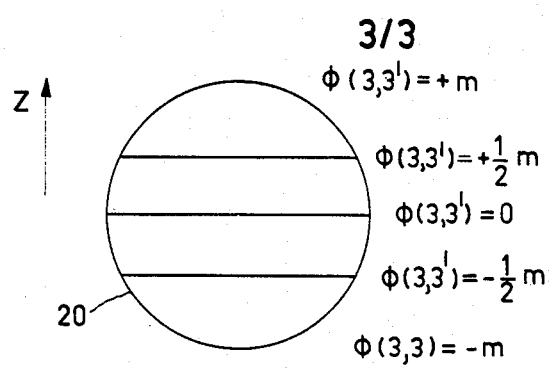
Figure 6:
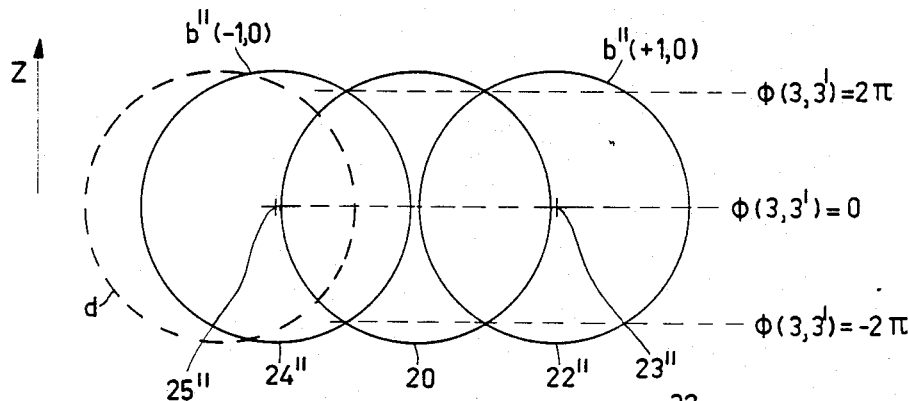
Figure 7:
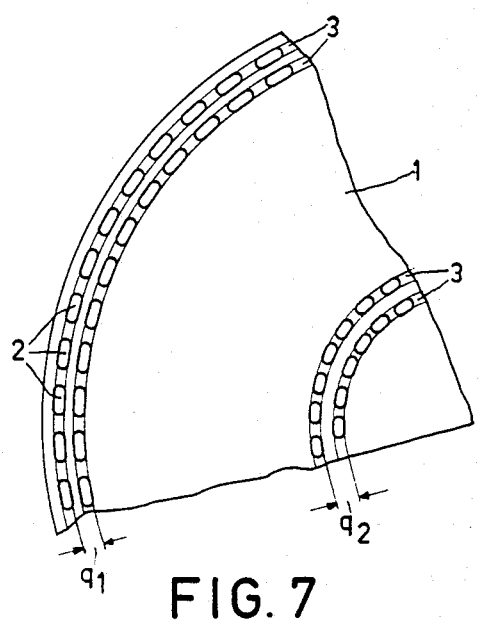
Figure 8:
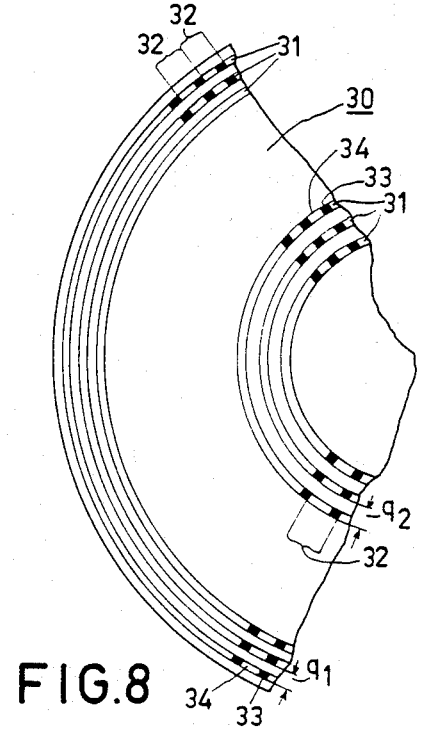

FIG. 3 shows cross-sections, in the pupil of the objective system, of the zero order subbeam and first order subbeams formed by a track to be read, FIG. 4 shows the path of the beams of radiation, originating from two adjacent tracks, through the objective system, FIG. 5 represents the time-independent phase variation across the pupil of the read objective caused by the radiation which originates from a track adjacent the track to be read, FIG. 6 shows cross-sections, in the pupil of the read objective, of the first order subbeams formed by the track disposed adjacent the track to be read, FIG. 7 shows a completely inscribed record carrier in accordance with the invention and FIG. 8 shows a record carrier in accordance with the invention in which information can be written by a user.

Figure 1:
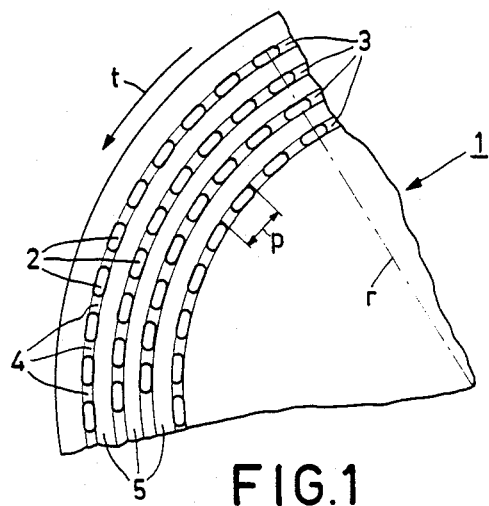
FIG. 1 shows a part of a known record carrier.

As is shown in FIG. 1, the information structure comprises a plurality of information areas 2 which are arranged in tracks 3. The information areas 2 are spaced from each other in the track direction, or tangential direction t, by intermediate areas 4. In the radial direction r the tracks 3 are spaced from each other by lands 5. The information areas may be pits pressed into the record carrier surface, or hills which project from the record carrier surface. The distance between the bottom of the pits, or the top of the hills, and the record carrier surface is in principle constant, and so is the width of the information areas 2. That distance and the width are not determined by the information stored in the structure.

The information to be disseminated by means of the record carrier is contained in the variation of the structure of areas in the tangential direction only. If a colour television program is stored in the record carrier, the luminance signal may be encoded in the variation of the frequency of the information areas 2 and the chrominance and sound signal in the ratio of the lengths of areas 2 to those of the areas 4. The record carrier may also contain digital information. In that case a specific combination of information areas 2 and intermediate areas 4 represents a specific combination of digital ones and zeros.

Figure 2:
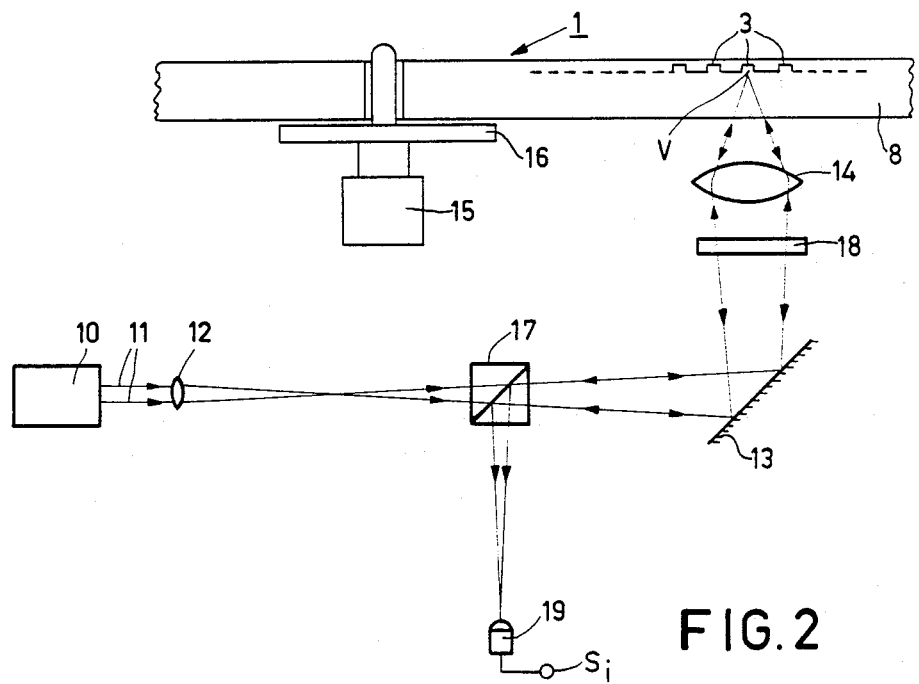
FIG. 2 shows a known apparatus for reading said record carrier.

The record carrier can be read with an apparatus which is schematically represented in FIG. 2. A monochromatic and linearly polarized beam 11, which is emitted by a gas laser 10, for example a heliumneon laser, is reflected to an objective system 14 by a mirror 13. The path of the radiation beam 11 includes an auxiliary lens 12 which ensures that the pupil of the objective system 14 is filled. Thus, a diffraction limited read spot V is formed on the information structure. The information structure is schematically represented by the tracks 3; i.e. the record carrier is shown in radial cross-section.

The information structure may be located on the side of the record carrier which faces the laser. However, preferably, as is shown in FIG. 2, the information structure is located on the side of the record carrier which is remote from the laser, so that the record carrier is read through the transparent substrate 8. The advantage of this is that the information structure is protected against fingerprints, dust particles and scratches.

The read beam 11 is reflected by the information structure and, as the record carrier is rotated by means of a platter 16 driven by a motor 15, it is modulated in accordance with the sequence of the information areas 2 and the intermediate areas 4 in a track being read. The modulated read beam again passes through the objective system 14 and is reflected by the mirror 13. In order to separate the modulated read beam from the unmodulated read beam the radiation path preferably includes a polarization-sensitive splitter prism 17 and a $\lambda/4$ plate 18, $\lambda$ being the wave length of the read beam. The beam 11 is transmitted to the $\lambda/4$ plate 18, by the prism 17, which plate converts the linearly polarized radiation into circularly polarized radiation which is incident on the information structure. The reflected read beam again trasverses the $\lambda/4$ plate 18, the circularly polarized radiation being converted into linearly polarized radiation whose plane of polarization has been rotated through 90° relative to the radiation emitted by the laser 10. Thus, upon the second passage through the prism 17 the read beam will be reflected, to the radiation sensitive detector 19. An electric signal $S_i$ is available at the output of the detector, the signal being modulated in accordance with the information being read.

The information structure is illuminated with a read spot V, whose half-value diameter is of the order of magnitude of that of the information areas 2. The information structure may be regarded as a diffraction grating which splits the read beam into an undiffracted zero spectral order subbeam, a plurality of first spectral order subbeams and a plurality of subbeams of higher spectral orders. For the purpose of reading the recorded information, the subbeams which have been diffracted in the track direction are principal significance, and these beams are mainly the subbeams which have been diffracted in the first orders. The numerical aperture of the objective system and the wavellength of the read beam are adapted to the information structure in such a way that the higher order subbeams fall mainly outside the pupil of the objective system and do not reach the detector. Moreover, the amplitudes of the higher order subbeams are small relative to the amplitudes of the zero order subbeam and the first order subbeams.

FIG. 3 shows the cross-sections of the first order subbeams, which have been diffracted in the track direction, in the plane of the exit pupil of the objective system. The circle 20 with the centre 21 represents the exit pupil. This circle also represents the cross-section of the zero order subbeam b(0,0). The ciircles 22 and 24 with the centres 23 and 25 respectively represent the cross-section of the first order subbeam b(+1, 0) and b(-1, 0) respectively. The arrow 26 represents the track direction. The distance between the centre 21 of the zero order subbeam and the centres 23 and 25 of the first order subbeams is determined by $\lambda/p$, where p (compare FIG. 1) represents the period of the areas 2 at the location of the read spot V.

In accordance with the method adopted for describing the read process, the first order subbeams overlap the zero order subbeam in the areas shown shaded in FIG. 3 and interference occurs. The phases of the first order subbeams vary if the read spot moves relative to the information track. As a result of this the intensity of the total radiation which passes through the exit pupil of the objective system and which reaches the detector 19 also varies.

When the centre of the read spot coincides with the centre of an information area 2, there is a specific phase difference $\psi$, called phase depth, between a first order subbeam and the zero order subbeam. When the read spot travels to a subsequent area, the phase of the subbeam $b(+1, 0)$ increases by $2\pi$. Therefore it is correct to state that when the read spot moves in the tangential direction the phase of this subbeam relative to the zero order subbeam changes by $\omega t$. Here $\omega$ is a time frequenty which is determined by the spatial frequency of the information areas 2 and by the speed with which the read spot travels over a track. The phase $\phi(+1,0)$ and $\phi(-1,0)$ of the subbeam $b(+1,0)$ and the subbeam $b(-1,0)$, respectively, relative to the zero order subbeam $b(0,0)$ may be represented by:

$$\phi(+1,0) = \psi + \omega t,$$
and $$\phi(-1,0) = \psi - \omega t, \text{ respectively.}$$

In accordance with the present read method, as is shown in FIG. 2, the parts of the first order subbeams which pass through the objective system are combined with the zero order subbeam on one detector 19. The time-dependent output signal of this detector may then be represented by:

$$S_i = A(\psi) \cdot \cos \psi \cdot \cos(\omega t),$$

where $A(\psi)$ decreases at decreasing value of $\psi$. The amplitude $A(\psi) \cdot \cos \psi$ of the signal $S_i$ is now a maximum for a phase depth $\psi = \pi$ rad.

The track being read is surrounded by adjacent tracks. Since the read spot is not a pointshaped spot, but a spot with a certain extension having a specific intensity distribution, these tracks receive a part of the read radiation and reflect certain amount of radiation to the objective system 14.

FIG. 14 shows portions of two adjacent tracks, or track portions 3' and 3'', as well as the objective system 14 in a schematic perspective view. It is assumed that the track 3' is to be read. The zero order subbeam 11a reflected by this track passes straight through the objective system, i.e. the chief ray of the beam 11a coincides with the optical axis 00' of the objective system 14. Apart from the beam 11a the objective system receives a beam 11b, which originates from the track 3''. This beam, which is represented by dashed lines in FIG. 4, passes obliquely through the objective system, i.e. the chief ray of this beam makes a specific angle $\beta$ with the optical axis.

This means that the spherical wave front ($g_2$) coming from the track 3'' is tilted through an angle $\beta$ relative to the spherical wave front ($g_1$) coming from the track 3'. For the sake of simplicity these wave fronts are represented, by the straight lines $g_2$ and $g_1$ in the right-hand part of FIG. 4. In the plane of the exit pupil of the objective system the beams coming from the tracks 3' and 3'' are not in phase with each other, but instead exhibit a phase difference $\phi(3', 3'')$ which is a function of the height z in the pupil. If for z=0, i.e. on the optical axis, the phase difference $\phi(3', 3'')$ is assumed to be zero, a phase difference corresponding to a path length difference w will exist at the edges of the pupil, i.e. for z=R and for Z=−R. R is the radius of the pupil of the objective system.

In the exit pupil of the objective system, lines of constant phase difference may be plotted. Some of these lines are shown in FIG. 5; m then means: maximum phase difference. The phase variation as a result of an adjacent track 3'' is determined by the track period q, i.e. the period of the information structure transverse to the track direction. On the one hand, $w = R \tan \beta$ and on the other hand $\tan \beta = q/1$, where 1 is the distance from the object point to the plane of the pupil of the objective system. As the angle $\beta$ is small, it is correct to state that $\tan \beta = \beta$. Therefore:

$$w = (R)/(1) q \text{ or: } w = (N.A.) q$$

where N.A. represents the numerical aperture of the objective system. The track period q may also be expressed in terms of the cut off frequency $$v_c \left( v_c = \frac{2 \cdot N.A.}{\lambda} \right)$$

of the objective system, namely as:

$$q = c \cdot \frac{\lambda}{N.A.}$$

where c represents a constant. It follows that: $w = c \cdot \lambda$. If c=1, the phase difference at the edges of the pupil, the value m in FIG. 5, is $2\pi$. A phase variation over two phase periods ($=2.2\pi$) then occurs over the total height 2R of the pupil.

So far the radiation coming from the track 3'', the beam i.e. 11b, has not been examined in detail. The track 3'' also gives rise to diffraction, so that a beam which is incident on this track is split into a zero order subbeam and various subbeams of higher diffraction orders. For the present observations only the tangentially diffracted +1 order subbeam $b''(+1,0)$ and the −1 order subbeam $b''(-1,0)$ are of importance. In the plane of the exit pupil of the objective system these subbeams have the same cross-sections as the subbeams $b(+1,0)$ and $b(-1,0)$ coming from the track 3'. If the frequencies of the information areas in the tracks 3' and 3'' are equal, the cross-sections of the subbeams $b''(-1,0)$ and $b''(+1,0)$ coincide with those of the subbeams $b(-1,0)$ and $b(+1,0)$. Generally, the frequency of the information areas in the adjacent tracks will not differ significantly, so that the cross-sections of the subbeams $b''(-1,0)$ $b''(+1,0)$ are shifted only slightly relative to those of the subbeams $b(-1,0)$ and $b(+1,0)$. The following is also based on this assumption.

FIG. 6 shows the cross sections of the subbeams $b''(-1,0)$ and $b''(+1,0)$.

As the read spot moves relatively to the tracks, the phases of the subbeams $b''(-1,0)$ and $b''(+1,0)$ vary depending on the sequence of the information areas 2 and intermediate areas 4 in the track 3''. This means that in the area of overlap of the subbeam $b''(-1,0)$ with the subbeam $b(0,0)$ the position-dependent phase difference $\phi(3', 3'')$ becomes time dependent. If in the area of overlap the position dependent phase variation covers an integral number of phase periods, the signals from the various parts within the area of overlap will compensate for each other despite the variation in time. This may be explained as follows. The phase variation over the pupil as a result of the presence of the track 3″ gives rise to light and dark stripes in the plane of the pupil. These stripes are imaged on the detector 19. As the read spot moves relative to the track the phase variation in the area of overlap of the subbeam b″(−1,0) with the subbeam b(0,0) changes, in other words, the strips will "travel". When an integral number of phase periods are disposed within the area of overlap the detector always "views" a constant number of light and dark stripes in that area of overlap despite the movement of the stripes. The same applies to the area of overlap of the subbeam b″(+1,0) with the subbeam b(0,0). The detector signal $S_i$ is then not dependent on the information areas in the track 3″, in other words, there is no cross-talk from the track 3″ to the track 3′ and vice versa.

FIG. 6 represents the situation where within the area of overlap of the subbeam b″(−1,0) with the subbeam b(0,0) a phase variation over two phase periods occurs. For this the track period q should be greater than the period which corresponds to half the optical cut-off frequency, in other words c should be greater than 1, so that w is greater than λ. For example, c is equal to 1.15.

The radiation from the track 3″ enters the objective system outside the area of overlap of the subbeam b″(−1,0) or b″(+1,0) with the subbeam b(0,0) is time independent and can only influence the amplitude of the signal $S_i$, but not the variation of this signal as a function of time.

In a similar way as with the subbeams b(−1,0) and b(+1,0), the locations of the centres 25″ and 23″ of the cross-sections of the subbeams b″(−1,0) and b″(+1,0) are determined by the tangential frequencies of the information areas, but now those of the information areas in the track 3″. FIG. 6 represents the situation that the frequency ν of the areas is approximately equal to half the cut-off frequency i.e. ν=N.A./λ. At increasing frequency ν the circle 24″ of the subbeam b″(−1,0) is shifted to the left, as is indicated by the dashed circle d in FIG. 6. The area of overlap of this subbeam with the subbeam b(0,0) and especially the height of this area, i.e. the dimension in the z-direction, is then reduced. Within the smaller area of overlap, when the track period q is constant, the position dependent phase variation no longer covers two phase periods, but for example one and a half phase period. The detector 19 then does not always "view" a constant number of light and dark stripes in the areas of overlap of the subbeam b″(−1,0) or the subbeam b″(+1,0) with the subbeam b(0,0) and the detector signal $S_i$ becomes dependent on the information areas in the track 3″, in other words, there is cross-talk from the track 3″ to the track 3′. It is obvious that the considerations in the foregoing equally apply to a track which is located to the right of the track 3′ in FIG. 4.

In accordance with the invention cross-talk is reduced by increasing the track period q for tracks with a higher frequency ν of the information areas. As a result of this the position dependent phase variation within the pupil of the objective system becomes steeper, since w then increases, so that also within the smaller area of overlap a phase variation over an integral number of, for example two, phase periods occurs.

In principle it is also possible to arrange the tracks, also tracks with a high frequency ν of the information areas, at such a short distance that the phase variation within the areas of overlap of subbeams b″(−1,0) and b″(+1,0) with the subbeam b(0,0) only covers one phase period. However, this imposes stringent requirements on the tracking. A small deviation between the centre of the read spot and the centre of a track 3′ to be read results in the wave front coming from the track 3′ also passing obliquely through the objective system. As a result of this the phase variation within the pupil and thus also within the areas of overlap changes. It is evident that if the phase variation covers only one phase period, i.e. if the track period q is small, the influence of the last-mentioned phase variation is greater than if the phase variation covers two or more phase periods. Moreover, at decreasing track period q more radiation of the read beam will be incident on the adjacent track 3″, so that the amplitudes of the first-order subbeams b″(−1,0) and b″(+1,0) increase, so that the influence of the track 3″ on the information signal $S_i$ increases.

In areas on the record carrier which contain tracks in which the frequency ν of the information areas is smaller than of the cut-off frequency ($ν_c$), the track period may be reduced, so that the information density in these areas is increased. Thus, for tracks in which $ν \leq 0.3\, ν_c$, the coefficient c=1 may be selected.

FIG. 7 shows an embodiment of a record carrier in accordance with the invention. This is a round disc-shaped record carrier in which a constant amount of information, for example one television picture, is stored in each revolution of the track 3. The frequency ν is greater in the inner tracks than in the outer tracks. The track period $q_2$ of the inner tracks is greater than the track period $q_1$ of the outer tracks. For a record carrier which is adapted to be read with a radiation beam whose wave length λ=0.633 μm and with an objective system whose numerical aperture N.A.=0.4, the track period q is approximately 1.67 μm for the tracks whose frequency ν is smaller than half the optical cut-off frequency. For these tracks the cross-talk is less than −40 dB. For the inner tracks, whose frequency ν is higher than 0.5, times the optical cut-off frequency, the track period $q_2$ is approximately 2 μm. The coefficient c introduced in the foregoing is then approximately 1.25. At a track period $q_2$=2 μm the cross-talk can also be maintained at a level smaller than −40 dB at a frequency ν of the information areas up to approximately 0.75 times the optical cut-off frequency. A cross-talk level of −40 dB is required in particular if the adjacent tracks contain entirely different information.

In a recent carrier in accordance with the invention the track period q may vary continuously in the radial direction. However, it is also possible that for example only two values for the track period occur. In that case there is one constant track period $q_1$ within an outer ring, and one equally constant but greater track period $q_2$ in the inner ring.

The fact that the invention has been described on the basis of a record carrier with a radiation reflecting information structure by no means implies that it is limited thereto. The invention may also be used in conjunction with a record carrier which is read in transmission. The aforementioned terms for the track period q, the frequency ν, the wave length λ and the numerical aperture of the objective system have been given solely by way of example and do not signify a limitation of the invention. Furthermore, it is not necessary that the record carrier is round and disc-shaped with circular tracks. In general the invention may be applied to record carriers with an optically readable information structure, which contains both tracks with a lower spatial frequency and tracks with a higher spatial frequency.

The invention may also be applied to a record carrier in which information can be written by the user.

In for example the previous Netherlands Patent Application No. 7802859 (PHN 9062) it has already been proposed to employ an optical record carrier as a storage medium for information other than video information and especially as a storage medium in which information can be written by the user. An example of this is information supplied by an (office) computer or radiographs made in a hospital. For this purpose the user receives a record carrier which is provided with a so-called, for example spiral, servo track, which extends over the entire record carrier area.

When information is written by the user, the radial position of the read spot relative to the servo track is detected and corrected with the aid of an opto-electronic servo system, so that the information is written in a spiral track of constant pitch with great accuracy. The servo track is divided into a multitude of sectors, for example 128 per revolution. FIG. 8 shows a plan view of a part of such a record carrier 30. The servo track is designated 31 and the sectors 32. Each sector comprises a track portion 34 in which the information may be written and a sector address 33 in which inter alia the address of the associated track portion 34 is encoded in address areas in for example digital form. The individual address areas, which are spaced from each other by intermediate areas in the track direction, are not shown in FIG. 8. The address areas may comprise pits pressed into the record carrier surface, or hills projecting from said surface.

In accordance with the invention the track period $q_2$ on the inside, where the address areas have a higher frequency and where the information is to be written in information areas of a higher frequency, is greater than the track period $q_1$ on the outside, where the address areas have a lower frequency and where the information is written in information areas with a lower spatial frequency.

The "blank" track portions 54 may comprise continuous grooves on which a layer of a reflecting material is deposited which, when exposed to suitable radiation, is subject to an optically detectable change. The layer for example consists of Bismuth in which information areas can be formed by melting.

What is claimed is:

1. A record carrier with an optically readable information structure comprising information areas arranged in a plurality of spaced apart tracks and separated from each other in the track direction by intermediate areas, at least the length of said information areas in the track direction varying in accordance with the information contained therein and the width of said information areas in a direction perpendicular to said track direction being substantially constant, the distance between the tracks in a direction normal to said track direction being dependent on the average length of said information areas such that said distance between tracks increases with decreasing average length of said information areas to thereby reduce cross-talk during reading of the information recorded on said carrier.

2. The record carrier according to claim 1 wherein said tracks are circular and each defines one turn of a spiral formed by said tracks on at least one surface of said carrier.

3. The record carrier according to claim 1 wherein at least some of said tracks have a first portion containing said information areas and said intermediate areas and a second portion provided with a material which is inscribable with optical radiation, the information areas in said first portion defining an address for said second portion.

4. A record carrier according to claim 1 wherein said tracks are essentially concentric circles containing substantially equal amounts of information and wherein the distance between the inner tracks is greater than the distance between the outer tracks.

5. The record carrier according to claim 4 wherein the distance between the inner tracks is approximately 2 $\mu$m and the distance between the outer tracks is approximately 1.6 $\mu$m.

* * * * *